June 19, 1962 F. H. BRAY ETAL 3,039,683
ELECTRICAL CALCULATING CIRCUITS
Filed June 6, 1958
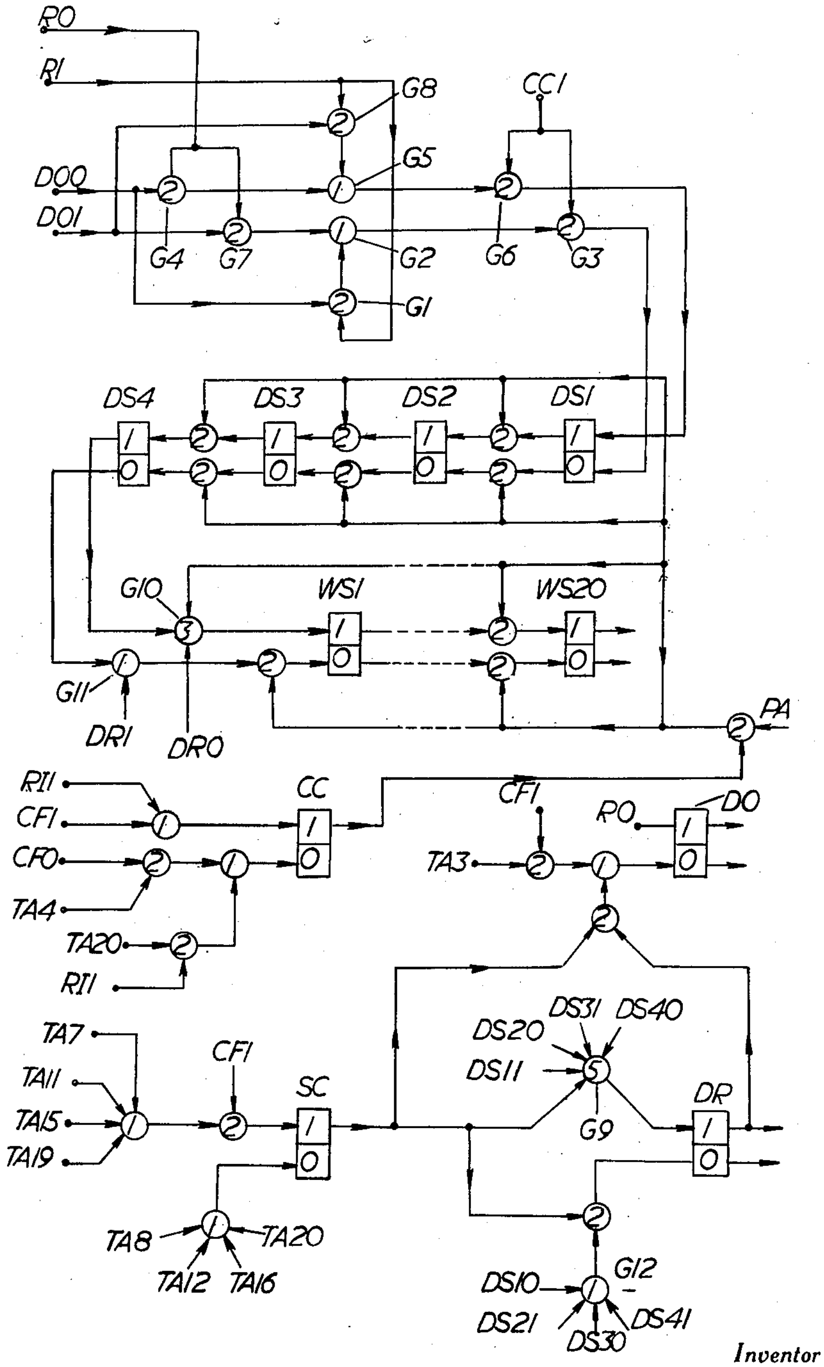
Inventor
F.H.Bray-D.G.Bryan
By
Attorney United States Patent Office
3,039,683
Patented June 19, 1962

3,039,683

ELECTRICAL CALCULATING CIRCUITS

Frederick Harry Bray and David Gerald Bryan, London, England, assignors to International Standard Electric Corporation, New York, N.Y.

Filed June 6, 1958, Ser. No. 740,435
Claims priority, application Great Britain June 20, 1957
6 Claims. (Cl. 235—92)

The present invention relates to a method of performing addition in a system in which the numbers dealt with are expressed in a coded decimal notation, and also to electrical calculating circuits for use in such a system.

A coded decimal notation is one in which each decimal digit of a number is represented by a code combination which identifies the actual decimal significance thereof, ignoring its denominational significance. One example of such a notation is the well-known binary-coded decimal notation. In that notation, each digit is represented by the corresponding four-digit binary digital combinations. For example, 73,946 is expressed in binary-coded decimal notation as:

0111/0011/1001/0100/0110

Thus each decimal digit is represented by a four-digit binary code combination. The oblique separating strokes shown above are not included in an actual representation of the number, being shown above to facilitate the recognition of the individual digital groups.

There are other methods of expressing a number in a coded-decimal representation, for instance there are other coding systems which use four digit two-condition (i.e. one or zero) representations. Another such coding system is the bi-quinary system. Yet another example of a coded decimal notation is a code in which each decimal digit is represented by a "two-out-of-five" code combination. In this case each decimal digit is represented by a characteristic combination of two "one" digits and three "zero" digits.

Adders in systems using coded decimal notation are, of course, well-known in the calculating art, and in general require complex circuitry to deal with carry. The reason for this is that carry can occur in a number of circumstances in each of which it is necessary to set the condition of the denomination from which the carry occurs to a condition other than that in which the addition has left it. This is, of course, in addition to the necessity of dealing with the actual carry to the next digital denomination.

The difficulties mentioned above have hitherto prevented the use of a coded decimal notation for use in circuits where the only addition involved is the addition of unity to a number. For such circuits, coded decimal notations are advantageous because there is no necessity for complex translations to obtain the decimal equivalent of a number. Such translation is of course, required where the numbers being dealt with are expressed in pure binary notation.

It is therefore an object of the present invention to provide a method of, and an electrical calculating circuit for, adding unity to a number expressed in a coded decimal notation which overcomes the above-mentioned disadvantages of previously-proposed coded decimal notation adders.

According to the present invention there is provided a method of adding unity to a number expressed in a notation in which each digit of the number is expressed as a multi-element code combination, which method comprises the steps of adding units to a digit of the number, testing the result of said addition to determine whether said addition has produced the code combination which represents the radix of said number, replacing the result of said addition by the combination in said multi-element code which represents zero if said test indicates that said result is the combination in said code which represents said radix, and also adding unity to the next higher denominational digit of said number if said test indicates that said result is the combination which represents said radix.

According to the present invention there is also provided an electrical calculating circuit for adding unity to a number expressed in a notation in which each digit of the number is expressed as a multi-element code combination which comprises means for adding unity to a digit of the number, test means for testing the result of said addition to determine whether said addition has produced the code combination which represents the radix of said number, means responsive to the determination by said test means that the result of said addition represents said radix to cause said result to be replaced by the combination in said multi-element code which represents zero, and means also responsive to said determination to cause unity to be added to the next higher denominational digit of said number.

According to the present invention there is also provided an electrical calculating circuit for adding unity to a number expressed in a notation in which each digit of the number is expressed as a multi-element code combination, which comprises an input circuit over which a number to which unity is to be added is received serially, gating means associated with said input circuit and arranged to add unity to a digit being received, a temporary storage circuit in which a received digit is inserted after it has passed through said gating means, an output circuit from said calculating circuit to which the elements of a digit are passed from said temporary storage circuit, a test circuit which tests the contents of said temporary storage circuit after a complete digit of said number has been received and inserted therein and determines whether the contents of said temporary storage circuit represents the radix of said number, means responsive to the detection by said test circuit that the contents of said temporary storage circuit represent said radix to cause the multi-element code combination which represents zero to be passed to said output circuit instead of the contents of said temporary storage circuit, the contents of said temporary storage circuit being passed unaltered to said output circuit if they represent a number less than said radix, and further means responsive to said test circuit detecting that the contents of said temporary storage circuit represent said radix to cause said gating means to add unity to the next received digit of said number, no such addition occurring if the contents of said temporary storage circuit represent a number less than said radix, whereby a carry due to the addition of unity to said number can be propagated through as many digital places thereof as is necessary.

According to the present invention there is further provided an electrical calculating circuit for adding unity to a number expressed in binary-coded decimal notation, wherein each decimal digit of the number is expressed as a four-element binary code combination, which comprises an input circuit over which a number to which unity is to be added is received serially, binary element by binary element, gating means associated with said input circuit and arranged to add unity to a digit being received by reversing all received binary elements up to and including the first 0 element, said gating means passing binary elements subsequent to said reversed 0 element without reversal, a temporary storage circuit having a capacity of one decimal digit (i.e. four binary elements) in which said elements are inserted after they have passed through said gating means, an output circuit from the calculating circuit to which the binary elements of a number are passed from said temporary storage circuit, a test circuit arranged to test the contents of said temporary storage circuit when a complete decimal digit of the number has been received and to detect whether the contents of said temporary storage circuit are binary 1010 (ten in decimal notation), means responsive to the detection by said test circuit that the contents of said temporary storage circuit are 1010 (ten in decimal notation) to cause 0000 (zero in decimal notation) to be passed to said output circuit for the digital place of said number to which said 1010 combination corresponds instead of the contents of said temporary storage circuit, the contents of said temporary storage circuit being passed unaltered to said output circuit if they represent a number less than ten, and further means responsive to said test circuit detecting 1010 to cause said gating means to add unity to the next received digit of said number, no such addition occurring if the contents of said temporary storage circuit represent a number less than ten, whereby a carry due to the addition of unity to a digit of said number can be propagated through as many digital places thereof as is necessary.

The invention will now be described with reference to the accompanying drawing, which shows a simplified circuit of an embodiment of the present invention for increasing a number expressed in binary coded decimal notation by unity.

A circuit for increasing a number by unity when required is suitable for use for a number of purposes, such as for subscriber's metering in an automatic telephone exchange system, and the adder which is described herein was, in fact developed for use in such a system. A metering arrangement is known which uses a ferrite store as an intermediate stage between the subscribers' lines and a magnetic drum. The ferrite store is a 100 row-10 column co-ordinate matrix serving 1000 lines, each of whose meter leads is connected to a winding on one of the cells of the ferrite matrix. A meter pulse on a subscriber's meter lead changes the cell for that subscriber's line from its normal to its operated state. The ferrite store is served by a 100 unit (10 x 10) access selector, which selects the rows of storage cells of the matrix one at a time. If any cell in a row is operated when it is selected, it is reset to normal and the output from its column sets a so-called column trigger. If several cells in the same row are operated when selected, then a corresponding number of column triggers are set. The setting of one or more of the column trigger stops the operation of the access selector, so that the setting of a pair of counters controlling the access selector records the identity of the row of the matrix whose contents have been transferred to the column triggers.

One of the features of the ferrite store is that if a meter pulse is present on a meter lead when the row including the cell to which that lead is applied is selected, the selecting condition is ineffective on that cell. That is, a selecting condition from the access selector can only reverse the state of an operated cell if the meter pulse which caused that cell to be operated has ended.

The access selector is a 10 x 10 co-ordinate array of ferro-magnetic cells each with a separate output winding, and when one cell of the access selector is selected under the control of a row counter and a column counter, an output pulse is obtained from that cell which supplies the selection condition for the corresponding row of the storage matrix. The magnetic drum has 10 tracks, each serving 100 lines, and the allocation of storage space on the drum is such that each setting of the row counter of the access selector identifies a different one of the 10 tracks, and the setting of the column counter identifies a group of 10 lines served by that track. Hence when a column trigger has been set and the access selector stopped as just described, the settings of the controlling counters together with the identity of the operated column trigger identify the section of drum storage for the line whose meter pulse recording has been found.

When the section of track containing the meter record of the line for which the access selector has been stopped reaches the read head of its track it is read out and stored in a temporary store after 1 has been addd to it by an adder according to the present invention. On the next revolution of the drum the amended record is recorded in the line's section of the drum storage. The same line's column trigger is then reset, and scanning re-started. If several column triggers are operated from cells in one row, the appropriate meter records are, howeve, all amended before scanning recommences.

Although the adder which is used in the metering arrangement just described is described in detail herein, the metering arrangement is not so described because such a description thereof is unnecessary for an understanding of the present invention.

Before describing the adder in detail, its basic principle will be described briefly. The number which may have to be amended by the addition thereto of unity, in the example discussed above, the meter record for one subscriber's line, is stored in a section of the track having capacity for 20 binary elements, of which elements 1 and 2 are used for control or "chalk-mark" recordings not relevant to the present invention, element 3 is a blank spacing element, elements 4—7 accommodate the units digit, elements 8—11 accommodate the tens digit, elements 12—15 accommodate the hundreds digit, elements 16—19 accommodate the thousands digit, and element 20 is an inter-number space.

When a subscriber's meter record is to be amended by the addition of unity thereto, it is read off the drum and applied to the adder, which includes a four-element pattern movement register fed via a gating network which reverses all binary elements applied to it up to and including the first 0. This is, of course, necessary to add 1 to a binary representation of a demical digit. As soon as 0 is reversed, the gating network is altered so that the elements are no longer reversed.

When the units digit is 9 (1001), it is necessary that the result of adding 1 should be 0 (0000) and carry 1. Hence the four-element pattern movement register is tested after each decimal digit to see if it contains 1010 (i.e. 10). If it does, the gating network is reset to its condition for adding 1, prior to the arrival of the tens digit.

As the tens digit arrives, the amended units digit passes to a temporary store, and if the amendment had set it to 10, then the result of the detection of 1010 in the four element pattern-movement register is to ensure that 0000 is passed to the temporary store for the units digit. The same testing operation is performed on the contents of the four element pattern movement register for each decimal digit, so that carry can be propagated through a plurality of successive decimal denominations.

In the accompanying drawing there is shown in schematic form the four element pattern movement register DS1 to DS4, the temporary store WS1 to WS20 (only WS1 and WS20 being shown) which also is a pattern movement register, the gating network which either causes digit reversal or not, as required, and the controlling bistable triggers. The pattern movement registers DS1 to DS4 and WS1 to WS20 each consist of a number of triggers interconnected by gates controlled by clock pulses (derived from the magnetic drum, which is not shown). Such clock pulse PA corresponds to an elemental position on the drum. The circuits are so arranged that the result of each clock pulse applied to the pattern movement register is to shift all the data stored therein one stage along the register. Hence the condition of DS2 is passed to DS3, that of DS1 to DS2, and so on, DS1 being left by the clock pulse in its 0 state. In addition to the clock pulses, a sequence of time pulses TA1 to TA20 is produced for each section of 20 binary elements on the drum, so that each elemental position may be identified by its particular TA time pulse. The simplest way to describe the circuit will be to describe its operation.

When a number is to be increased by one, an input lead CF1 is energised and the energisation normally present on lead CF0 is removed, which sets the trigger CC to CC1 operated, and at the same time the number to be modified commences to be read from the drum. For a 1 element, input lead R1 is energised and for a 0 lead input lead R0 is energised. The first two elements, which coincide with pulses TA1 and 2 are "chalk mark" elements, and of no interest in connection with the present invention. When the time pulse TA3, which coincides with a blank element, is received, the coincidence of input CF1 energised and TA3 present sets trigger D0 to D00 energised. This is the condition in which elements received over R0 and R1 are reversed.

If the first binary element of the units digit as read from the drum is 1, the combination of R1 energised and D00 operated opens gates G1, G2 and G3 (since CC1 is operated) in series, so that an operating condition is applied to unit 0 of trigger DS1, which is therefore set to (or left at) 0. When CC1 was operated as already described, the gate via which pulses PA are supplied to the two registers WS1—WS20 was opened. Hence the next PA pulse, which comes between two incoming elements opens the gates between DS1 and DS2, with the result that the condition of DS1 is passed to DS2.

When a binary 0 element is received, R0 is energised instead of R1, and since D00 is operated, gates G4, G5 and G6 open in series, so that DS1 is operated to DS11 energised. The energisation of R0 also sets D0 to D01, thus stopping the element reversal. This is necessary, because, as already indicated, digit reversal is terminated when a received 0 digit is reversed. As before, the next PA pulse causes transfer of the element to DS2.

Elements succeeding that which was reversed from 0 to 1 are received and inserted one by one into DS1 without reversal, since D01 is now operated, as can be seen from an inspection of gates G7 and G8. Thus for a 1 element, G8, G5 and G6 open in series to set DS1 to DS11 energised, and for a 0 element, G7, G2 and G3 open in series to set DS1 to DS10. After each element is inserted in DS1 the whole pattern is moved along the register by a PA pulse. As long as trigger DR remains at DR0 energised, transfer from DS4 to WS1 occurs in the usual way, i.e., DS41 to WS11 via gate G10 and DS40 to WS10 via gate G11.

It has already been pointed out that when 9 is increased by 1, it is necessary to record the units digit as 0000 and carry 1, i.e. add 1 to the tens digit. The binary combination for 9 is 1001, and hence after 1 has been added thereto, the state of DS1 to DS4 will be DS11, DS20, DS31, DS40, that is, DS will contain the binary combination 1010.

The triggers SC and DR ensure that carry and recording occur correctly when 9 is increased to 10. At the end of each received digit, i.e. at TA7, TA11, TA15 and TA19, which coincide with the fourth elements of the units, tens, hundreds, and thousands digits respectively, the trigger SC is set to SC1 operated, since the energisation of CF1 is present throughout the reception of the number. The operation of SC1 prepares gate G9, and if the register DS1 to DS4 is set at 1010 when SC1 is operated, gate G9 applies an operating condition to DR1, which sets the trigger DR to DR1 operated. This closes gate G10 since DR0 is no longer operated, and opens G11. Hence for as long as DR1 is energised, each pulse PA will cause a 0 element to be passed to WS1, gate G11 being a "one" gate. Gate G11 must be a "one" gate in order to permit 0 elements to pass to WS1 when the stored number is less than 10 and DR1 is not energised. A "two" gate is interposed between gate G11 and WS10 in order to control the passage of the 0 elements by the PA pulses. Gate G10 is normally prepared for opening by DR0 which is normally energized. At TA8, coincident with the first element of the tens digit, SC is reset to SC0, thus isolating DR and leaving it at DR1 operated. Before SC is reset, however, the coincidence of SC1 and DR1 operated restores D0 from D01 to D00. Therefore the circuit is now ready to add unity to the tens digit.

The gating network G1—G8, and D0, together function in the manner already described to add 1 to the tens digit, each element dealt with being inserted in DS1. As before, each PA pulse moves the pattern along DS once and inserts 0 into WS1. Hence when the fourth element is received, 0000 is inserted into WS. D0 will have been returned to D01 energised, and the amended tens digit is in DS1 to DS4. At TA11, coincident with the last element of the tens digit, SC is again set to SC1 operated. If the tens digit is 1010, i.e. if the addition of 1 has set DS1 to DS4 to 1010, G9 opens, but as DR is already at DR1 this has no effect on DR. The coincidence of SC1 and DR1 again sets D0 to D00, ready to add 1 to the hundreds digit. TA12 again sets SC to SC0.

If the tens digit was less than 9 before the addition, i.e. DS1 to DS4 contains a combination other than 1010, at least one of the inputs to G12 is energised. Hence G12 opens, and since SC is at SC1 operated, this sets DR to DR0. Therefore D0 is left at D01, and therefore subsequent elements enter DS unaltered, and normal transfer from DS to WS is resumed.

After the tens digit, TA12 resets SC to SC0, similar reset controls for SC also being provided at TA16 and TA20 for the hundreds and thousands digits.

After 24 pulse time's, i.e. at TA4 of the "number period" following that in which the number has been amended, the amended number will be all in WS1 to WS20. By this time, CF0 will be energised and not CF1 and hence the coincidence of CF0 and TA4 sets CC to CC0 operated. This terminates the supply of clock pulses to WS and DS. Hence the amended number rests in WS.

When the number in WS is to be extracted therefrom, RI1 is energised, which sets CC to CC1. This always happens just before TA1. Hence pulses are again applied to WS (and DS) and the number in WS is driven out of WS. When TA20 occurs, which occurs as the last digit leaves WS20, the combination of TA20 and RI-1 resets CC to CC0, thus stopping the pulse supply to the registers.

Although the adder has been mentioned as being intended for use as an integer in a telephone subscriber's metering arrangement it is useful in other systems wherein single events have to be counted. Thus for instance it has applications in the field of apparatus for making inventory records.

While the principles of the invention have been described above in connection with specific embodiments, and particular modifications thereof, it is to be clearly understood that this description is made only by way of example and not as a limitation on the scope of the invention.

What we claim is:

1. An electrical calculating circuit for adding unity to a number expressed in a notation in which each digit of the number is expressed as a multi-element code combination, which comprises means for feeding signals representing digits of said number into said circuit in succession element-by-element, means for adding unity to a digit of the number as it is fed into said circuit, storing means for storing the signals representing the entire digit with unity added, test means for testing the result of said addition to determine whether said stored signals are the code combination which represents the radix of said number, an output circuit, means for serially transferring signals from said storing means to said output circuit without affecting said storing means, means responsive to the determination by said test means that the result of said addition represents said radix to cause said transferring means to alter said signals as they are transferred to a combination in said multi-element code which represents zero, and means also responsive to said determination by said test means for causing unity to be added to the next higher denominational digit of said number.

2. An electrical calculating circuit for adding unity to a number expressed in a notation in which each digit of the number is expressed as a multi-element code combination, which comprises an input circuit over which signals comprising a number to which unity is to be added are received serially, gating means associated with said input circuit and arranged to add unity to a digit being received, a temporary storage circuit, means for feeding signals representing the result of the addition into said temporary storage circuit after they have passed through said gating means, an output circuit from said calculating circuit, means for serially feeding signals from said temporary storage circuit to said output circuit, a test circuit for testing the contents of said temporary storage circuit after the signals of a complete digit of said number have been received and inserted therein and determining whether the contents of said temporary storage circuit represent the radix of said number, means responsive to the detection by said test circuit that the contents of said temporary storage circuit represent said radix for causing signals representing the multi-element code combination which represents zero to be passed serially to said output circuit instead of the contents of said temporary storage circuit without affecting said temporary storage circuit, and for causing the contents of said temporary storage circuit to be passed unaltered to said output circuit if it represents a number less than said radix, and further means responsive to said test circuit detecting that the contents of said temporary storage circuit represents said radix for causing said gating means to add unity to the next received digit of said number, no such addition occurring if the contents of said temporary storage circuit represent a number less than said radix, whereby a carry due to the addition of unity to said number can be propagated through as many digital places thereof as is necessary.

3. An electrical calculating circuit for adding unity to a number expressed in binary-coded decimal notation, wherein each decimal digit of the number is expressed as a four-element binary code combination, which comprises an input circuit over which binary signals representing a number to which unity is to be added are received serially, binary element by binary element, gating means associated with said input circuit and arranged to add unity to a rigit being received by reversing all received binary elements up to and including the first 0 element, while passing binary elements subsequent to said reversed 0 element without reversal, a temporary storage circuit having a capacity of one decimal digit (i.e. four binary elements), means for inserting said elements serially into said temporary storage circuit after they have passed through said gating means, an output circuit, means for passing the binary elements of a number from said temporary storage circuit to said output circuit, a test circuit for testing the contents of said temporary storage circuit when a complete decimal digit of the number has been received and for detecting whether the contents of said temporary storage circuit are binary 1010 (ten in decimal notation), means responsive to the detection by said test circuit that the contents of said temporary storage circuit are 1010 (ten in decimal notation) for causing 0000 (zero in decimal notation) to be passed to said output circuit for the digital place of said number to which said 1010 combination corresponds instead of the contents of said temporary storage circuit and without affecting said temporary storage circuit, means for passing the contents of said temporary storage circuit unaltered to said output circuit if it represents a number less than ten, and further means responsive to said test circuit detecting 1010 for causing said gating means to add unity to the next received digit of said number, and for causing no such addition if the contents of said temporary storage circuit represents a number less than ten, whereby a carry due to the addition of unity to a digit of said number can be propagated through as many digital places thereof as is necessary.

4. An electrical calculating circuit, as claimed in claim 3, in which said temporary storage circuit comprises a four-stage pattern-movement register into which the binary elements of a number are inserted from said gating means, and in which said test circuit comprises a coincidence gating means whose controls are all energised immediately after a decimal digit has been fully received if, and only if, the setting of said pattern-movement register represents binary 1010, a bi-stable device, means for setting and bistable device to its "on" state when all of said coincidence gating means controls are energised, and further gating means, responsive to the setting of said pattern movement register to a combination other than 1010 immediately after a decimal digit has been fully received, for restoring said bi-stable device to its "off" state.

5. An electrical calculating circuit, as claimed in claim 4, and in which said first-named means responsive to said detection by the test circuit comprises further gating means between said pattern movement register and said output circuit for normally passing a number from said pattern movement register to said output circuit without alteration, but, responsive to said bi-stable device being in its on state, for causing a series of signals representing four 0 digits to be applied to said output circuit 6. An electrical calculating circuit, as claimed in claim 5, and in which said further means responsive to said detection by said test circuit comprises a further bi-stable device, means for setting said further bi-stable device to its "on" state, means responsive to said further bi-stable device being in its "on" state for causing said reversal of the binary elements applied to said gating means when unity is to be added to a number, means responsive to the reversal thereby of a 0 digit for resetting said further bi-stable device to its "off" state, means responsive to said further bi-stable device being in its "off" state for causing no reversal of said binary elements by said gating means, and means for resetting said further bistable device to its "on" state when the bi-stable device in said test circuit is in its "on" state.

References Cited in the file of this patent

UNITED STATES PATENTS

| | | |
|---|---|---|
| 2,577,075 | Dickinson | Dec. 4, 1951 |
| 2,823,855 | Nelson | Feb. 18, 1958 |
| 2,886,241 | Spaulding et al. | May 12, 1959 |
| 2,890,831 | Townsend | June 16, 1959 |
| 2,898,042 | Womersley et al. | Aug. 4, 1959 |
| 2,928,601 | Curtis | Mar. 16, 1960 |
| 2,947,479 | Selmer | Aug. 2, 1960 |